United States Patent Office 3,775,429
Patented Nov. 27, 1973

3,775,429
PROCESS FOR PREPARING 3-INDOLYL ACETIC ACIDS
Meyer Sletzinger, North Plainfield, and John M. Chemerda and George Gal, Watchung, N.J., assignors to Merck & Co., Inc., Rahway, N.J.
No Drawing. Continuation-in-part of abandoned application Ser. No. 873,701, Nov. 3, 1969, which is a division of application Ser. No. 660,234, Aug. 14, 1967, now Patent No. 3,527,796, which in turn is a continuation-in-part of abandoned application Ser. No. 586,364, Oct. 13, 1966. This application Nov. 3, 1971, Ser. No. 195,471
Int. Cl. C07d 27/56
U.S. Cl. 260—326.13 A          4 Claims

ABSTRACT OF THE DISCLOSURE

Process for preparing 1-aroyl-3-indolyl acetic acids by direct acylation of substituted phenylhydrazine sulfonates and subsequent condensation and cyclization with levulinic acid. Said products are useful as anti-inflammatory agents.

CROSS-REFERENCE TO RELATED APPLICATION

This application is a continuation-in-part of application Ser. No. 873,701, filed Nov. 3, 1969, now abandoned, which is a divisional of application Ser. No. 660,234, filed Aug. 14, 1967, now U.S. Pat. 3,527,796, which is a continuation-in-part of application Ser. No. 586,364, filed Oct. 13, 1966, now abandoned.

SUMMARY OF THE INVENTION

This invention relates to a process for preparing 1-p-chlorobenzoyl-2-methyl-5-methoxy (or 5-dimethylamino)-3-indolyl acetic acids. This invention further relates to intermediate compounds for the preparation of these 3-indolyl acetic acids and to processes for preparing said intermediates.

The 3-indolyl acetic acid compounds prepared by this invention are well known anti-inflammatory agents and are effective in the prevention and inhibition of granuloma tissue formation. They are also of value in the treatment of arthritic and dermatological disorders and like conditions which are responsive to treatment with anti-inflammatory agents. For these purposes these compounds have been administered in tablets, capsules and the like in dosage ranges of from 10 to 100 mg. per day.

In the past, a 1-acyl-3-indolyl acetic acid has been prepared by condensing an acyl phenylhydrazine with levulinic acid. The acyl phenylhydrazine has been prepared by reacting a phenylhydrazine with an aldehyde or ketone to form the corresponding hydrazone. The hydrazone formation was necessary in order to selectively acylate the α-nitrogen of the hydrazine compound. After acylation the protective aldehyde or ketone was regenerated selectively from the hydrazone by hydrolyzing said hydrazone. The thus formed acyl phenylhydrazine was then condensed with levulinic acid and cyclized to form the desired 1-acyl indole.

We have found that a phenylhydrazine sulfonate, which is a precursor in the synthesis of phenylhydrazines and a more stable product than the phenyldrazines, may be directly acylated at the α-nitrogen using aqueous media to yield exceptionally pure and high yields of the acylated phenylhydrazine compound. This latter compound may then be condensed with levulinic acid or a labile ester thereof, as, for example, a loweralkyl, benzyl or phenyl ester, and cyclized to form the desired 1-acyl-3-indolyl acetic acid.

It is therefore an advantage of this invention that the acylated phenylhydrazine may be prepared directly from the phenylhydrazine sulfonate without first forming the hydrazone, while at the same time obtaining high yields and purer products under aqueous conditions. Further advantages will become evident as the process is more fully described.

The 1-acyl-3-indolyl acetic acid compounds of this invention may be prepared by acylating the phenylhydrazine sulfonate in the presence of a solvent such as water, a mixture of water and a water miscible solvent such as lower alkanols (methanol, isopropanol, t-butanol and the like) dioxane, DMF and the like, or nonaqueous solvents such as toluene, benzene and the like; preferably, however, the acylation is carried out in the presence of a water-alcohol system such as water-isopropanol or water-t-butanol. The acylated hydrazine compound is then condensed with levulinic acid and heated to cyclize the intermediate to form the 1-acyl-3-indolyl acetic acid compound. When the acylation is carried out in any appreciable amount of water it is preferred to first isolate or separate the acylated compound before reaction with levulinic acid. However, the condensation and cyclization may, if desired, be carried out in an essentially aqueous media.

DETAILED DESCRIPTION

The several aspects of this invention may be depicted by the following flowsheet:

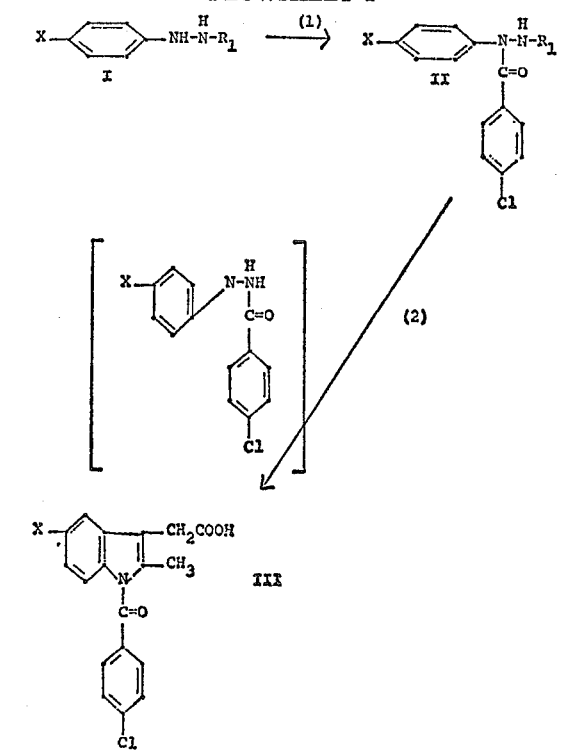

Equivalents.—X is methoxy or dimethylamino; $R_1$ is a sulfonate, sulfonate alkali or alkali earth salt (preferably sodium salt) or sulfonate ammonium salt or organic derivative thereof as, for example, an amine addition salt such as the benzylamine, cyclohexylamine, dibenzylamine, N-benzyl-β-phenethylamine and the like [by sulfonate is meant $SO_3H$].

The first aspect of our invention, Step 1, is the acylation of Compound 1 using acylating agents, such as a p-chlorobenzoyl halide, azide, nitrophenyl ester or anhydride. Step 2, in combination with Step 1, depicts another aspect of this invention wherein, after completing Step 1, Compound 2 is hydrolyzed and subsequently condensed with levulinic acid or its esters and cyclized to the desired 3-indolyl acetic acid. Suitable levulinic acid esters include, but are not limited to, the benzyl, phenyl and loweralkyl esters. The term "loweralkyl" shall include any straight or branched chain group having from 1 to 8 carbon atoms. Alternatively, the phenylhydrazine sulfonate may be hydrolyzed and condensed with levulinic acid to form the corresponding phenylhydrazone and subsequently acylated and cyclized to form the desired product.

The following is a more detailed description of each of the process steps:

Step 1.—Acylation of the hydrazine sulfonate (Compound 1) with an acylating agent, such as a p-chlorobenzoyl halide, anhydride, nitrophenyl ester or azide, preferably the halide and especially p-chlorobenzoyl chloride. The solvent system is not critical and therefore as indicated previously, it may be water, organic solvents, such as alcohols (lower alkanols, methanol, ethanol, t-butanol and the like) benzene, toluene, dioxane, tetrahydrofuran and the like, or may be combinations of organic solvents, or preferably miscible organic solvents and water, such as water-alkanols (water-methanol, water-isopropanol, water-t-butanol and the like) or water-dioxane. The temperature of the reaction is not critical and therefore temperature ranges from 0° C. to the reflux temperature of the system may be suitably employed, although it is preferred to use temperatures of 15–45° C. The reaction may be carried out in the presence of a base such as organic bases [tri-alkylamine (triethylamine and the like)], inorganic bases (sodium carbonate, sodium hydroxide and the like) or in an acid, preferably however, the reaction is carried out without the addition of a base or acid.

Step 2.—Condensation and cyclization of the hydrazine compound with levulinic acid or its ester, preferably in an acidic media, particularly in a strong organic or inorganic acid or mixtures thereof, such as hydrochloric acid, sulfuric acid, phosphoric acid, trichloroacetic acid or a mixture of acetic acid and a mineral acid, and more particularly inorganic acids, especially anhydrous acids such as sulfuric acid, hydrogen chloride, phosphoric acid, and the like, at temperatures of 40–150° C., preferably 70–90° C. or 100–150° C. if no acid is used. Although solvents are not required, solvents such as lower alkanoic acids (acetic acid, propionic acid), dioxane water, acetonitrile, dimethoxyethane, toluene, benzene, ethylene glycol or the acid catalyst mentioned above are preferably used. Also, if it is desired, levulinic acid or its esters may be used as the solvent as well, or mixtures of other solvents and levulinic acid. Preferably, however, an anhydrous aromatic solvent (toluene, benzene, xylene) or lower alkanoic acids are best employed as solvents for this step.

In one of the preferred embodiments of this invention a p-methoxy (or dimethylamino) phenylhydrazine sulfonate sodium salt [J. D. Riedel, D. R. P., 70, 459, issued 1892; J. Altschul, Chem. Ber., 25, p. 1844 (1892] is acylated in an essentially aqueous system with a p-chlorobenzoyl halide (especially the chloride) to form the acylated phenylhydrazine compound. The temperature of the reaction being from 15–45° C. The acylated phenylhydrazine compound thus formed is separated from the water reaction mixture and subsequently condensed in the presence of an organic solvent, with levulinic acid and an essentially anhydrous acid such as phosphoric acid and the reaction mixture heated to form the desired 1-p-chlorobenzoyl-2-methyl-5-methoxy (or dimethylamino)-3-indolyl acetic acid. This latter reaction is carried out at temperatures between 70–90° C.

EXAMPLE 1

N-α-(p-chlorobenzoyl)-p-methoxyphenyl-
hydrazine hydrochloride (A) N - α - (p-chlorobenzoyl)-p-methoxyphenylhydrazine sulfonate.—A solution of p-methoxyphenylhydrazine sulfonate sodium salt (0.2 mole) in aqueous hydroxide (10 ml.) 1 N and dioxane (25 ml.) is mixed at room temperature and 6.5 g. of p-chlorobenzoyl chloride in 5 ml. of dioxane is added simultaneously with 60 ml. of 1 N aqueous sodium hydroxide over a period of one hour. The mixture is cooled in ice and the product filtered, washed with ethanol and recrystallized from ethanol in water to give N-α-(p-chlorobenzoyl)-p-methoxyphenylhydrazine sulfonate sodium salt, M.P. 200° C., with decomposition and thin layer system butanol:ammonium hydroxide, $NH_4OH$ (4:1), $R_f$ .8–.85 single spot.

(B) N - α-(p-chlorobenzoyl)-p-methoxyphenyldrazine hydrochloride.—The product obtained from part (A) is dissolved in ethanolic hydrochloric acid (10 ml.:0.5 ml.) and the reaction mixture heated to reflux for 2 hours. The mixture is then filtered and the solvent evaporated. The residue is crystallized from ethyl acetate to give the desired product, N-α-(p-chlorobenzoyl)-p-methoxyphenyl hydrazine hydrochloride, M.P. 179–180° C.

EXAMPLE 2

1-p-chlorobenzoyl-2-methyl-5-methoxyindole-3-
acetic acid

To a slurry of sodium-p-methoxy-phenylhydrazine sulfonate (24.25 g.) in 150 ml. water and 8.3 ml. concentrated hydrochloric acid is added 15 ml. of p-chlorobenzoyl chloride. The reaction mixture is stirred for one hour. Levulinic acid (12.3 ml.) is added and the mixture heated at 70° C. for 5 hours. The mixture is then extracted with 2× 500 ml. portions of 80° C. toluene. The hot toluene solution is treated with 5.0 g. of charcoal and then concentrated to a small volume. The crude product crystallizes and is filtered. Two recrystallizations from t-butanol gives substantially pure 1-p-chlorobenzoyl-2-methyl-5-methoxyindole-3-acetic acid.

EXAMPLE 3

1-p-chlorobenzoyl-2-methyl-5-methoxy-3-indolyl
acetic acid (A) N - p - chlorobenzoyl-N-p-methoxyphenylhydrazine.—To a stirred slurry of 0.2 mole of sodium-p-methoxyphenylhydrazine sulfonate in 210 ml. of water and 90 ml. of t-butanol is added 29.7 ml. of p-chlorobenzoyl chloride. After one hour of stirring at room temperature the batch is heated to 75–80° C. and stirred at that temperature for an additional hour. 350 ml. of hot (60° C.) toluene is then added followed by 76.6 ml. of sodium hydroxide solution. The aqueous phase is then separated and extracted with 150 ml. of hot toluene, and the organic layer washed with 150 ml. of hot water. The toluene extracts are combined and concentrated in vacuo to remove the t-butanol and then diluted to 700 ml. with toluene.

(B) 1-p-chlorobenzoyl - 2 - methyl - 5 - methoxy-3-indolyl acetic acid.—To the stirred hot (80° C.) solution of toluene from part (A) above is added 57.7 ml. of 100% phosphoric acid. After 15 minutes of agitation 25.5 ml. of levulinic acid is added and the mixture heated to reflux and continued for 1.5 hours. The temperature of the mixture is then lowered to 80° C. and hot water added. The aqueous layer is then removed, and extracted with hot toluene. The toluene extracts are then combined and concentrated in vacuo to yield the product.

EXAMPLE 4

1-p-chlorobenzoyl-2-methyl-5-methoxy-3-indolyl
acetic acid

To a stirred slurry of sodium-p-methoxyphenylhydrazine sulfonate (48.5 g.) in 210 ml. of water and 90 ml. of t-butanol is added in one portion 29.7 ml. of p-chlorobenzoyl chloride. After one hour of stirring at room temperature the batch is heated to 75–80° C. and stirred at that temperature for another hour. To the hot, stirred solution 350 ml. of hot toluene (80° C.) is added followed by 76.6 ml. of sodium hydroxide solution (25% by weight). The aqueous phase is separated and extracted with 150 ml. of hot toluene (80° C.). The organic layers are washed with 150 ml. of hot water (80° C.). The combined extracts (about 700 ml.) are concentrated to 200 ml. (20 inches of vacuum, 75° C.) to remove the t-butanol, then diluted to 700 ml. with toluene. To the stirred hot (80° C.) toluene solution of the acyl hydrazine, in a 2 liter, 3-necked flask equipped with a Dean-Stark water separator, is added 54.7 ml. (78.4 g.) of phosphoric acid (85–89%). After 15 minutes agitation, 25.5 ml. (29.0 g.) of levulinic acid is introduced and the mixture heated to reflux. Refluxing is continued for 1½ hours while water separates in the trap. After this period the temperature is lowered to 80°, 250 ml. hot water (80° C.) is added and stirring continued for 5 minutes. The aqueous layer is removed, extracted with 150 ml. of hot toluene (80° C.) and the extracts are washed with 150 ml. of hot water (80° C.). The comibned extracts are concentrated to 150–200 ml., then seeded if necessary, and allowed to crystallize slowly while cooling to room temperature (about one hour). After aging at 0–5° for 3 hours, the product is filtered, washed with four 15 ml. portions of toluene and dried in vacuo (40° C.) to constant weight. The product is obtained, M.P. 157–159° C.

What is claimed is:

1. A process for preparing an indole compound of the formula:

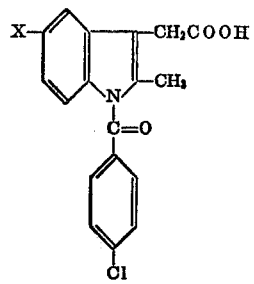

wherein X is methoxy or dimethylamino, which comprises in combination the steps of:

(a) acylating a compound of the formula:

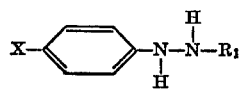

wherein $R_1$ is sulfonate, sulfonate alkali or alkali earth salt or sulfonate ammonium salt and amine addition salts thereof, and X is methoxy or dimethylamino, with p-chlorobenzoyl halide, azide, anhydride or nitrophenyl ester of p-chlorobenzoic acid, in the presence of a solvent, to form an N-acyl hydrazine compound; and (b) admixing said N-acyl hydrazine compound while heating at temperatures of up to 150° C. in the presence of a strong acid, with levulinic acid or its benzyl, phenyl or loweralkyl esters, optionally in the presence of a solvent, to form the desired indole compound.

2. A process for preparing an indole compound of the formula:

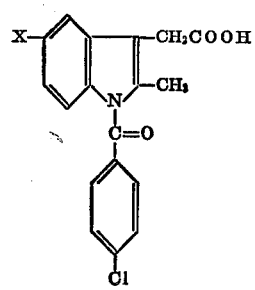

wherein X is methoxy or dimethylamino, which comprises in combination the steps of:

(a) acylating a compound of the formula:

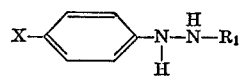

wherein $R_1$ is sulfonate, sulfonate alkali or alkali earth salt or sulfonate ammonium salt and amine addition salts thereof, and X is methoxy or dimethylamino in the presence of water-alkanol, with p-chlorobenzoyl halide to form an N-acyl hydrazine compound; and (b) admixing said N-acyl hydrazine compound while heating at temperatures of up to 150° C. in the presence of a strong acid with levulinic acid to form the desired indole compound.

3. The process of claim 2 wherein the acylating agent is p-chlorobenzoyl chloride.

4. A process for preparing an indole compound of the formula

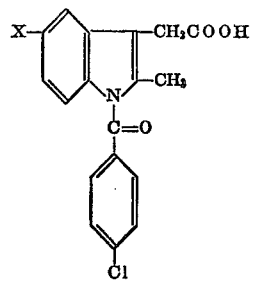

wherein X is methoxy or dimethylamino, which comprises in combination the steps of:

(a) acylating a compound of the formula:

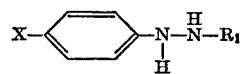

wherein $R_1$ is sulfonate, sulfonate alkali or alkali earth salt or sulfonate ammonium salt and amine addition salts thereof, and X is methoxy or dimethylamino, with p-chlorobenzoyl halide, azide, anhydride or nitrophenyl ester of p-chlorobenzoic acid, optionally in the presence of a solvent, to form an N-acyl hydrazine compound; and (b) admixing said N-acyl hydrazine compound while heating at temperatures of up to 150° C. with levulinic acid or its benzyl, phenyl or loweralkyl esters to form the desired indole compound.

References Cited

UNITED STATES PATENTS 3,390,154  6/1968  Gal _____ 260—326.13 A

JOSEPH A. NARCAVAGE, Primary Examiner

U.S. Cl. X.R.

260—326.14 A, 999